M. A. NORMAN.
CONVERTIBLE FREIGHT CAR.
APPLICATION FILED AUG. 15, 1919.
1,361,896.
Patented Dec. 14, 1920.
3 SHEETS—SHEET 1.
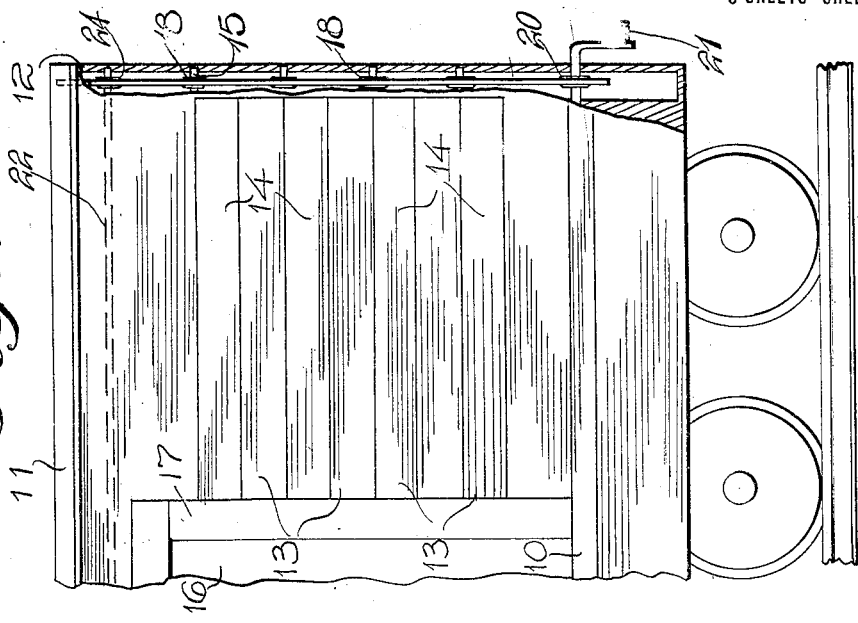
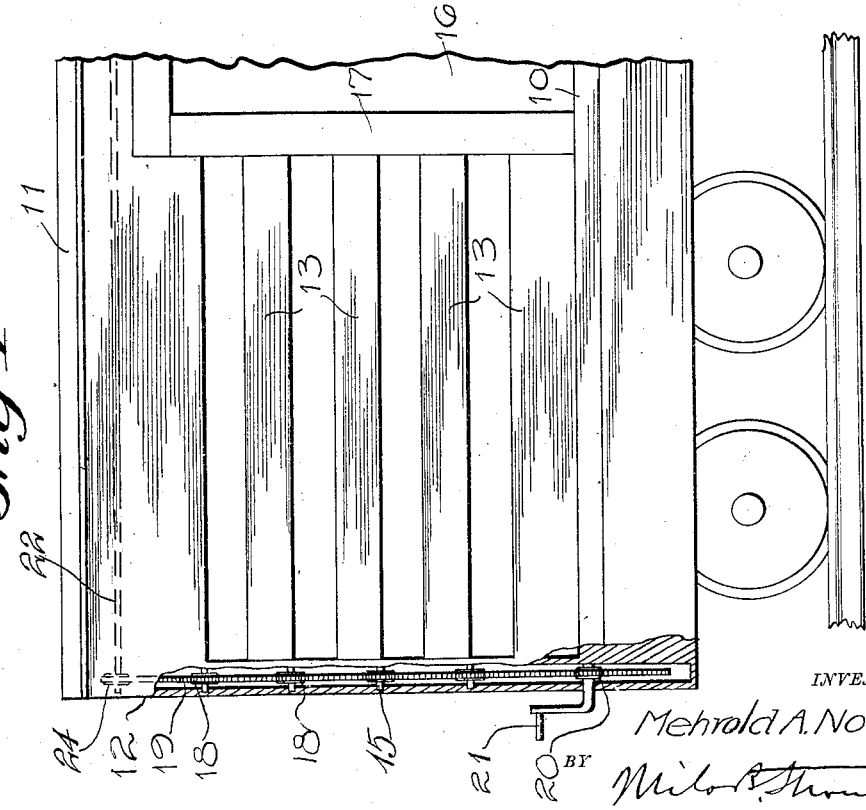
INVENTOR.
Mehrold A. Norman
BY
ATTORNEYS.

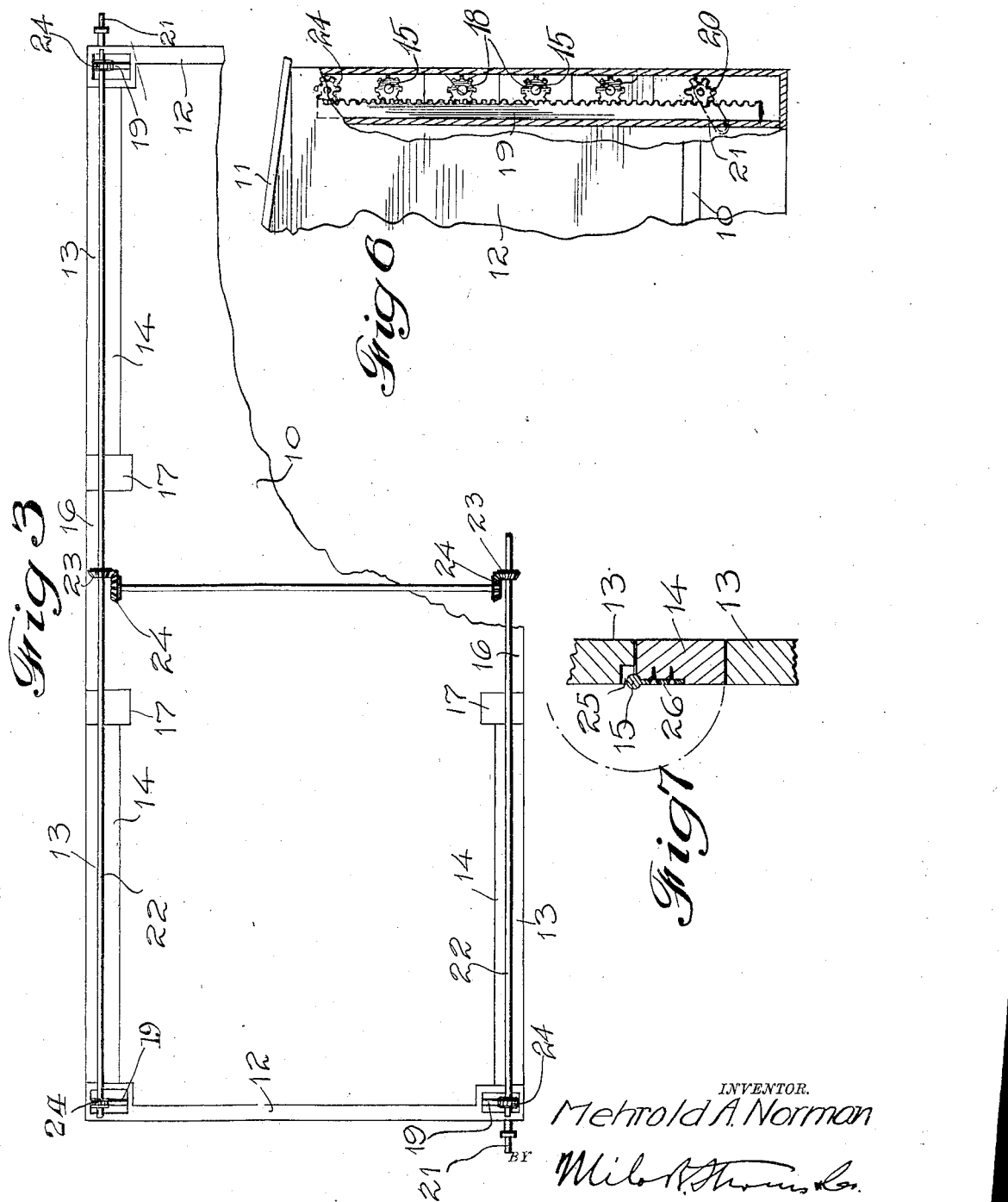

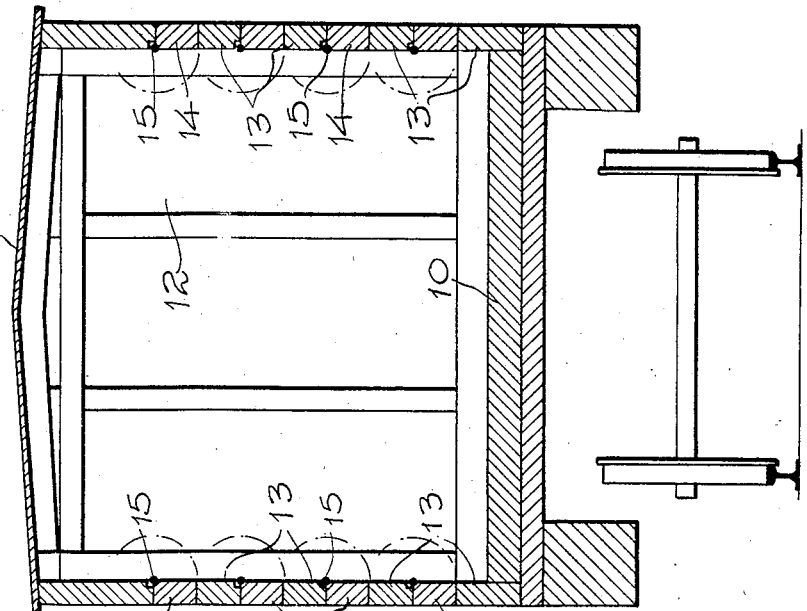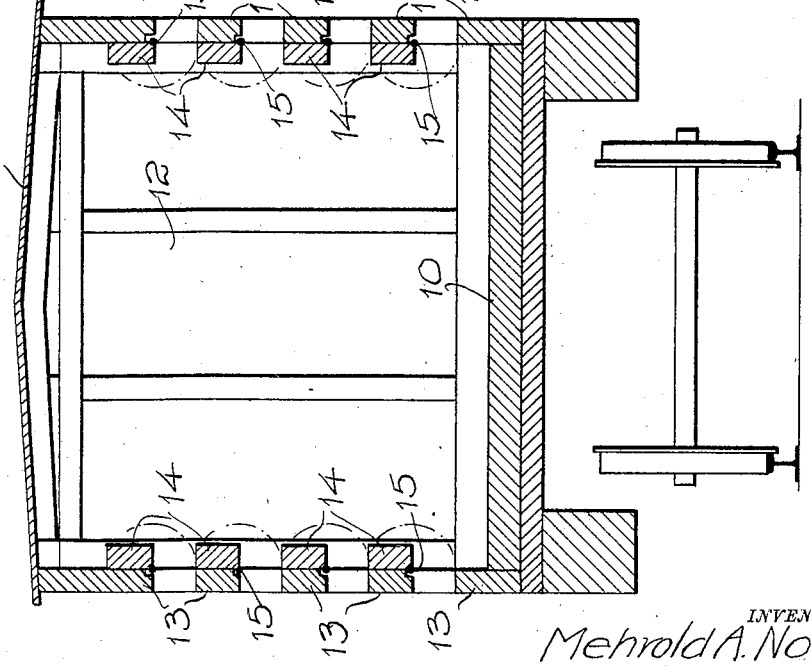

UNITED STATES PATENT OFFICE.

MEHROLD A. NORMAN, OF CHICAGO, ILLINOIS.

CONVERTIBLE FREIGHT-CAR.

1,361,896.　　　Specification of Letters Patent.　　Patented Dec. 14, 1920.

Application filed August 15, 1919. Serial No. 317,763.

*To all whom it may concern:*

Be it known that I, MEHROLD A. NORMAN, a citizen of the United States, residing at Chicago, in the county of Cook and State of Illinois, have invented new and useful Improvements in Convertible Freight-Cars, of which the following is a specification.

This invention relates to railway freight cars which may be converted from an ordinary closed freight or box car into an open car for transporting live stock.

The invention has for its object to provide a car of the kind stated which is very simple in construction and which can be easily converted from one kind of car into the other.

The object stated is attained by means of a novel combination and arrangement of parts to be hereinafter described and claimed, and in order that the same may be better understood, reference is had to the accompanying drawing forming a part of this specification.

In the drawings,

Figure 1 is an elevation of a portion of the car, showing the sides thereof open;

Fig. 2 is a similar view, showing the sides of the car closed;

Fig. 3 is a plan view;

Figs. 4 and 5 show the car in cross-section, with sides open and closed, respectively;

Fig. 6 is an end view of the car, partly broken away, showing the operating gear therein; and Fig. 7 is a sectional detail of the side wall construction of the car.

Referring specifically to the drawings, 10 denotes the floor, 11 the roof, and 12 the end walls of a freight car. These parts are all constructed and arranged in the ordinary manner, and as nothing is claimed therefor a detailed description thereof is not necessary. The trucks on which the car body is mounted are also not a part of the present invention and therefore need not be described. The invention relates more particularly to the side walls of the car, these being constructed so that the car may be converted from a closed freight or box car into an open-walled stock car.

Each side wall of the car is composed of alternating fixed and movable longitudinal slats 13 and 14, respectively. When the car is to be used as a closed freight or box car the slats 14 are seated between the slats 13 to form a solid closed wall, and when the car is to be used for transporting live stock, an open-walled structure may be had by swinging the slats 14 out of the spaces between the slats 13, thus leaving said spaces entirely vacant and unobstructed. The slats 14 are so supported and operated that they may be swung simultaneously into and out of the spaces between the slats 13.

Each slat 14 is carried by a hinge rod or shaft 15 which is journaled in the end walls 12 and the door frame of the car. It will be noted each side of the car has a door 16 set in a frame 17, these parts being of ordinary construction. The slats forming the side walls are in two sections, one section extending between one side of the door frame and one end of the car, and the other section extending between the other side of the door frame and the corresponding end of the car.

On the ends of the rods 15, at each end of the car, are pinions 18 which are in mesh with vertically slidable rack bars 19, one of which latter is operated by a pinion 20 in mesh therewith and having a crank handle 21.

The motion of the slats 14 on one side of the car is transmitted to the slats 14 on the other side by a gearing between the rack bars 19. This gearing comprises longitudinal shafts 22 located on opposite sides of the car, at the top thereof, and connected by bevel gears 23, and a driving connection between said shafts and the racks obtained by bevel gears 24 on the former meshing with the latter. It will therefore be seen that one pinion 20 will operate all the slats, but diagonally positioned pinions, or one at each corner of the car may be provided so that the slats may be set as desired at either side or end of the car.

The slats 14 swing inwardly and upwardly to open position, and in this position they seat back of the fixed slats 13. At the inner bottom corners of the slats 13 are recesses 25 to seat the rods 15, the slats 14 being made fast to said rods by straps 26.

It will be noted that the illustrations do not embody such details of railroad car construction as may have to be provided to fully adapt the car to the converting mechanism. Such details of construction come within the skill of craftsmen in the particular art, and do not involve invention. Suffice it to state that the converting mechanism will cause no radical alteration in, or departure from, standard methods of railroad car construction.

I claim:

1. A railway car having a side wall composed of fixed and movable slats, hinge rods carrying the movable slats and adapted to swing the latter to leave vacant the spaces between the fixed slats, and means connected to the hinge rods for operating the movable slats.

2. A railway car having a side wall composed of fixed and movable slats, hinge rods carrying the movable slats and adapted to swing the latter to leave vacant the spaces between the fixed slats, gears on the hinge rods, and a rack in mesh with the gears.

3. A railway car having its side walls composed of fixed and movable slats, hinge rods carrying the movable slats and adapted to swing the latter to leave vacant the spaces between the fixed slats, gears on the hinge rods, racks in mesh with the respective gears, and a gearing between the racks.

In testimony whereof I affix my signature.

MEHROLD A. NORMAN.